United States Patent
Engels et al.

(10) Patent No.: US 8,116,574 B2
(45) Date of Patent: Feb. 14, 2012

(54) RESULT FILTER AND METHOD FOR SELECTING THE RESULT DATA OF AN APPLICATION FOR AUTOMATIC PATTERN RECOGNITION

(75) Inventors: Heinz-Peter Engels, Munich (DE); Ute Feuerlein, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1183 days.

(21) Appl. No.: 11/898,980

(22) Filed: Sep. 18, 2007

(65) Prior Publication Data

US 2008/0069477 A1    Mar. 20, 2008

(30) Foreign Application Priority Data

Sep. 19, 2006  (DE) .................... 10 2006 043 910

(51) Int. Cl.
*G06K 9/62* (2006.01)
(52) U.S. Cl. ...................................................... 382/224
(58) Field of Classification Search .......... 382/128–134, 382/141–152
See application file for complete search history.

(56) References Cited

U.S. PATENT DOCUMENTS

| | | | |
|---|---|---|---|
| 4,984,282 A * | 1/1991 | Manns et al. | 382/149 |
| 6,125,194 A | 9/2000 | Yeh et al. | |
| 2002/0028006 A1 * | 3/2002 | Novak et al. | 382/128 |
| 2003/0016850 A1 * | 1/2003 | Kaufman et al. | 382/128 |
| 2003/0095696 A1 | 5/2003 | Reeves et al. | |
| 2004/0122790 A1 | 6/2004 | Walker et al. | |

OTHER PUBLICATIONS

Schuster: Früherkennung des Bronchialkarzinoms mit der Niedrig-Dosis-Sprial-CT: Einfluss der Strahlendosisreduktion auf die Volumetric pulmonaler Rundherde, Dissertation an der Medizinischen Fakultät der Ludwig-Maximilians-Universität in München, 2004.
McKenna et al.: "Care Computed Tomography: Computer Tomography Sets New Standard for the Clinical Workflow", Medical Solutions, Jan. 2006, pp. 62-67.

* cited by examiner

*Primary Examiner* — Alex Liew
(74) *Attorney, Agent, or Firm* — Harness, Dickey & Pierce, P.L.C.

(57) ABSTRACT

A method is disclosed for automatically classifying and graphically visualizing image objects that are segmented and, given undershooting of a prescribed distance and compliance with a similarity criterion, are combined to form clusters. In at least one embodiment, for object classification, the method includes preselecting result data, using a prescribable selection criterion, from a result set of an application, executed in the background on an image data record of an imaging system, for feature extraction and automatic pattern recognition of segmented and clustered image objects, and/or rendered image data of an image rendering application, executed in the background, for two-dimensional and/or three-dimensional graphic visualization of these image objects; and/or marking the data in a graphically visible fashion as preselected on a screen of a screen terminal.

19 Claims, 9 Drawing Sheets

| Image object and/or marking type | Color of the marking and its text label | Shape of the marking | Frame-exceeding follow-up tracking mode |
|---|---|---|---|
| Object markings and region markings of unselected image objects identified by the pattern recognition application 102d | red | circular | activated |
| Object markings and region markings of identified image objects that have been selected via a selection criterion of the result filter 102d', and manually added object markings and region markings | yellow | square | activated |
| Manually added further markings (for example position markings of spatial points of identified image objects) | yellow | triangular | activated |
| Object markings and region markings, to be noted in findings and/or report file 105, of identified image objects that have been selected via a selection criterion of the result filter 102d', and manually added object markings and region markings | green | square | not activated |
| Manually added further markings to be noted in findings and/or report file 105 (for example position markings of spatial points of identified image objects) | green | triangular | not activated |
| Deleted object markings and region markings of identified image objects preselected via the result filter 102d' | bright blue | square | not activated |
| Deleted object markings and region markings of identified non-preselected image objects | bright blue | circular | not activated |

RESULT FILTER AND METHOD FOR SELECTING THE RESULT DATA OF AN APPLICATION FOR AUTOMATIC PATTERN RECOGNITION

PRIORITY STATEMENT

The present application hereby claims priority under 35 U.S.C. §119 on German patent application number DE 10 2006 043 910.4 filed Sep. 19, 2006, the entire contents of which is hereby incorporated herein by reference.

FIELD

Embodiments of the present invention generally relate to a result filter of a pattern recognition and image rendering system, and/or to a procedure. For example, they may relate to one integrated in a method for automatically classifying and graphically visualizing image objects that are segmented and combined to form clusters, for selecting informative data from a result set of an application for feature extraction and automatic pattern recognition of coherent image objects that, for example, can be used in the clinical field in the course of the medical examination of radiological image data that display abnormal tissue structures in a patient's body interior to be examined.

BACKGROUND

In many fields of technology, in particular in the clinical field, in automotive and automation engineering, in robotics and in criminology, increasing use is currently being made of applications in image processing, pattern recognition and content-based image retrieval. CAD algorithms such as, for example, noise suppression, contrast improvement, edge detection, segmentation and clustering algorithms, required for image preprocessing and which are used in combination with feature extraction, pattern recognition and volume rendering algorithms, serve in this case for finding, segmenting, grouping, identifying and/or classifying, highlighting and/or 3D visualization by means of imaging methods of image objects displayed in two-dimensional form. In the case of an application in medical technology, these image objects can be, for example, abnormal tissue structures in a patient's body region that is to be examined such as, for example, pulmonary nodules, pulmonary embolisms, kidney stones and/or gallstones, intestinal polyps, metastases of gastrointestinal tumors, etc. that were displayed graphically, together with the abdominal, thoracic and/or pelvic body tissue surrounding them, with the aid of imaging methods of radiology (for example by means of sonography, X-ray computed tomography and/or magnetic resonance tomography) in the form of axial (transverse), sagittalen (lateral) and/or coronal (frontal) 2D tomograms.

Since many of the pattern recognition applications normally used in the course of computer-aided diagnostic tools operate with a relatively high recognition accuracy, and can therefore return a substantial number of findings at each individual program invocation that must then, for example, be displayed graphically in two and/or three dimensions and be individually evaluated by a radiologist, the evaluation of these result data is extremely time consuming. In addition, not all result data returned per program invocation have a high diagnostic significance or are suitable for predicting a specific course of disease. Depending on the type of sickness, a radiologist requires a different number of findings for the purpose of reliably diagnosing a specific clinical picture and for making a reliable prediction of the likely further course of this disease. The radiologist has in this case to monitor all the findings that are automatically documented by the respective application in a report file or findings file, in order to detect and reliably exclude possibly wrongly diagnosed positive and/or negative findings.

Once such a pattern recognition application suitable for carrying out a computer-aided diagnosis has been started, it is normally necessary for the CAD algorithms required to carry out a 2D or 3D image rendering of recognized image objects and/or for carrying out image postprocessing to be called up and started manually. This means that after the pattern recognition application has output its findings, the radiologist must call up all the CAD algorithms required for graphically visualizing the corresponding image objects, for image cropping and image section enlargement, for varying the display perspective, the color tone, the color saturation, the brightness and/or the contrast of individual image objects etc. separately from one another via control commands to be input manually. This leads to interruptions in the normal operational cycle that, when added up, signify a not inconsiderable expenditure of time unacceptable for routine use of a computer-aided diagnostic tool.

Moreover, with the computer-aided diagnostic tools currently commercially available, the radiologist is constrained to check all findings displayed in graphic form individually, to evaluate them and document them in a report file or findings file. This mode of procedure is extremely time consuming and yields no sort of advantages with regard to the reliability of the diagnosis of a disease and to the reliability of the prediction of a course of disease to be expected.

SUMMARY

In at least one embodiment, the present invention includes reducing the time outlay in the examination and evaluation of result data of automatic pattern recognition algorithms.

At least one embodiment of the invention discloses a result filter and an associated method for preselecting significant data from a result set of an application, executed on an image data record, for feature extraction and automatic pattern recognition for a subsequent examination and evaluation of the result data obtained when executing this application that can be used, for example, in the clinical field in the context of medical findings relating to a patient's tissue structures that are to be examined.

Here, at least one embodiment of the present invention relates in particular to a method for automatically classifying and graphically visualizing image objects that are segmented and, given undershooting of a prescribed distance and compliance with a similarity criterion, are combined to form clusters, which is characterized in that, for the purpose of object classification, result data are preselected, using a prescribable selection criterion, from a result set of an application, executed in the background on an image data record of an imaging system, for feature extraction and automatic pattern recognition of segmented and clustered image objects, and/or rendered image data of an image rendering application, executed in the background, for two-dimensional and/or three-dimensional graphic visualization of these image objects, and/or said data are marked in a graphically visible fashion as preselected on a screen of a screen terminal. According to the invention, the prescribable selection criterion can, for example, be the designation, the type, the status, the size, the number, a prescribable priority, or the relevance of classified image objects that is to be taken into consideration for a later evaluation.

It is provided here according to at least one embodiment of the invention that all the image processing algorithms required for preprocessing such as, for example, filtering and edge detection algorithms, all segmentation, clustering, feature extraction and pattern recognition algorithms required for carrying out a classification and/or identification of displayed image objects, and volume rendering algorithms that are required to convert image data of a series of two-dimensional tomograms into a screen graphic for displaying a perspective view that is produced by central projection of object coordinates of a number of volume data, obtained by mutual overlapping of the two-dimensional tomograms, onto a projection surface provided by the display surface of a screen, are started directly after conclusion of a scanning operation of the imaging method in the background, independently of whether a further evaluation procedure is performed later with the aid of a computer-aided clinical application program (for example by means of LungCARE, a clinical application, developed by the Siemens company, for automatically finding, recognizing and documenting pulmonary foci in the form of more or less sharply delimited densification of circumscribed extents, in a chest X-ray picture).

According to at least one embodiment of the invention, the preselection of result data and/or rendered image data can in this case be performed either directly after termination of the application for automatic pattern recognition of segmented and clustered image objects, or subsequent to an image rendering application, executed in the background during or after execution of the application for automatic pattern recognition, for providing rendered image data for a two-dimensional and/or three-dimensional graphic visualization of the segmented and/or clustered image objects.

In the first of these cases, object classes determined by the pattern recognition application are selected by restricting an object class space, forming the basis of this application, via user-specified selection criteria of a result filter. In this case, image data of identified image objects whose object classes are not included in the restricted object class space are suppressed.

In the other case, only classified image objects that are preselected and marked in a graphically visible fashion as preselected within an image section selected by a region marking are displayed on the screen of the screen terminal by suppressing the transmission to the screen terminal of rendered image data of all remaining image sections and classified image objects. The rendered image data of the non-selected image sections and/or of the classified image objects that are not preselected and/or marked in a graphically visible fashion as preselected can be transmitted upon request by a user to the screen terminal and graphically visualized on its screen.

According to at least one embodiment of the invention, within image regions of rendered 2D and/or 3D views of the image data returned with the selected result data a user can insert or remove again object markings and/or region markings with or without text labels for identifying displayed image objects and/or specific sections of an image region displayed on a screen, for example by operating a computer mouse, a PC keyboard or any other desired input device. Moreover, he/she can also insert or remove again position markings with or without text labels for identifying and specifying the spatial coordinates of spatial points of displayed image objects, text labels for specifying the orientation of these image objects in an object space defined by the pairwise orthogonal axes of a three-dimensional Cartesian object coordinate system, and/or text labels for specifying the view perspective which can be defined by the spatial position of a displayed flat cube for defining the spatial direction of directional vectors of an axial, coronal or sagittal object plane.

Upon recognition, identification or deletion of a wrongly classified image object (for example given the presence of result data of a false positive or false negative finding), the abovementioned selected result set, which is, for example, a list, sorted according to a prescribable sorting criterion (for example according to designation, type, status, size, priority or relevance of classified lesions for the diagnosis of a specific clinical picture), of findings to be evaluated, is automatically updated in accordance with at least one embodiment of the invention, the result data of the finding following as respective next list element automatically moving up to the list place of the finding recognized, identified or deleted as wrong. The possibility exists here of manually adding result data of additional findings that relate to further image objects identified and/or classified by a user to the list of the findings to be evaluated, as a result of which the power of the selected result set, and thus the number of the findings to be evaluated, are increased by the number of the additional findings.

It is, moreover, provided according to at least one embodiment of the invention that depending on designation, type, status, size, priority and/or relevance of the marked image objects and/or the image objects included in marked image sections, object markings and region markings for marking image objects and/or image sections are graphically displayed in different ways, for example as graphic symbols of different shape and/or color or as text labels of different font size, font type and/or font color. The above-named object markings can, for example, in this case be markings of a user-specifically configurable shape and/or color with the aid of which wrongly identified tissue structures are evaluated and identified as the finding of a false recognition, in order to avoid false positive and/or negative findings. According to at least one embodiment of the invention, the shape and color of the relevant graphic symbols and the font size, font type and font color of the text labels can be prescribed via a configuration table in the user-specific fashion, the color of the associated text labels expediently corresponding to the color of the respective object markings and/or region markings. The display parameters of the object markings and region markings are in this case stored permanently and transparently in an object marking list and/or region marking list together with the designation, the type, the status, the size, the priority and/or the relevance, as well as with the associated text labels of the marked image objects and/or the image objects included in the marked image sections.

According to at least one embodiment of the invention, object markings of image objects from the result set of deleted findings are also displayed on the screen of the screen terminal after the deletion of these findings. Moreover, it can be provided according to the invention that object markings and/or region markings deleted by a user, as well as their associated text labels, are identified as deleted in the object marking list and/or region marking list, but continue to be displayed in graphic and/or in textual form on the screen of the screen terminal, it being possible, for example, to vary the color and/or shape of the displayed markings and the font size, font type and/or font color of the associated text labels in order to permit the user greater ease in tracking, monitoring and, if appropriate, reversing actuated deletion operations.

At least one embodiment of the present invention further relates to a pattern recognition and image rendering system for automatically classifying and graphically visualizing image objects that are segmented and, given undershooting of a prescribed distance and compliance with a similarity criterion, are combined to form clusters, that has a result filter for preselecting result data for object classification from a result set of an application, executed in the background on an image data record of an imaging system, for feature extraction and automatic pattern recognition of segmented and clustered image objects. The result filter is in this case directly downstream of the application for automatic pattern recognition of the segmented and clustered image objects.

In addition, or as an alternative thereto, it is also possible to provide a result filter for preselecting and/or graphically visible marking of preselected rendered image data of an image rendering application, executed in the background, for two-dimensional and/or three-dimensional graphic visualization of classified image objects on a screen of a screen terminal by using a prescribable selection criterion. The result filter is downstream of an image rendering application, executed during or after execution of the application for automatic pattern recognition, for graphically visualizing the segmented and/or clustered image objects.

Moreover, at least one embodiment of the present invention relates to a computer software program product for carrying out the method outlined above during operation on a screen terminal of the above-described pattern recognition and image rendering system.

BRIEF DESCRIPTION OF THE DRAWINGS

Further properties, features, advantages and applications of the basic invention result from the subordinate dependent patent claims and from the following description of example embodiments that are illustrated in the following schematic drawings, in which:

The steps of embodiments of the inventive method are described in detail in the following sections with the aid of the attached drawings, starting from two computer-aided diagnostic tools known from the prior art.

DETAILED DESCRIPTION OF THE EXAMPLE EMBODIMENTS

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/ or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

Figure 1A:
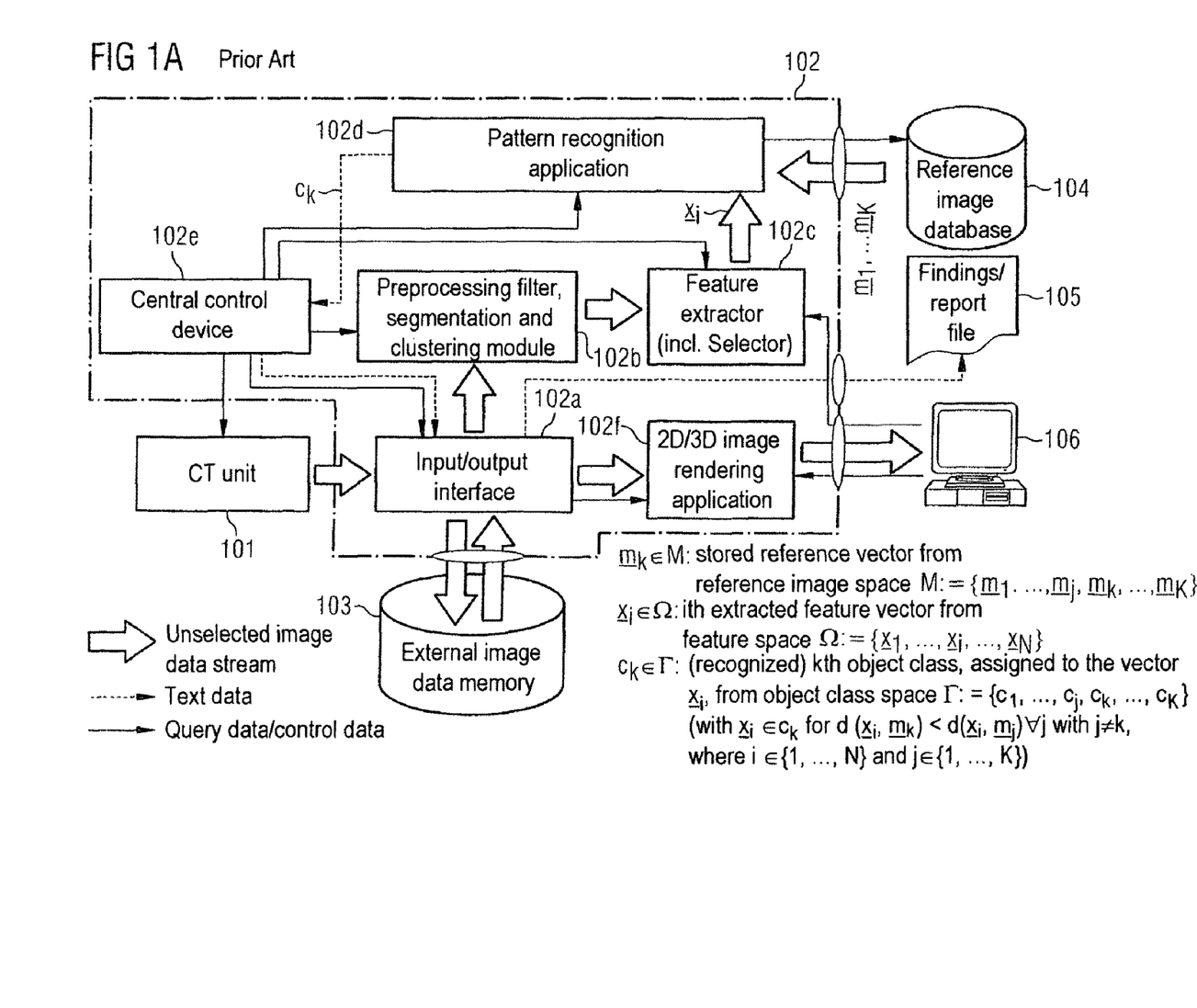
FIG. 1a shows a schematic block diagram of an image processing and pattern recognition system, known from the prior art, for the segmentation, feature extraction and automatic pattern recognition of image objects that have to be identified and whose image data has been generated with the aid of a radiological imaging method and are graphically displayed with the aid of an image rendering application in the form of two-dimensional tomograms and/or three-dimensional perspective views.

FIG. 1a shows a schematic block diagram of an image processing and pattern recognition system 102 that is known from the prior art and has suitable preprocessing filters for noise suppression, contrast improvement and edge detection, as well as software modules for segmentation and cluster formation, for feature extraction, automatic pattern recognition and graphic visualization of image objects to be identified, in a virtual object space. The above-named filters and modules are illustrated here as blocks 102b, 102c, 102d and 102f, respectively. The image data of the image objects to be identified and of the virtual object space surrounding them are generated, for example, by a sonography unit, a magnetic resonance tomography unit or, as illustrated by way of example in FIG. 1a, by a computed tomography unit 101, and are provided to the image processing and pattern recognition system 102 via an input/output interface 102a.

Upon being received by the computed tomography unit 101, image data are stored in preparation for a further graphic visualization, either temporarily or permanently in an external image data memory 103, depending on system configuration. A copy of these image data is fed via an input/output interface 102a to a preprocessing block 102b that has a digital filter for noise suppression, contrast improvement and edge detection. After being filtered, the image data are acquired as coherent image objects by a segmentation and clustering module, likewise included in the preprocessing block 102b, and (if possible) combined to form groups ("clustered") of analogous or similar image objects arranged closely juxtaposed. Subsequently, for each segmented image object or for each group of clustered image objects a feature extractor 102c is used to extract from the image data of the segmented and/or clustered image objects significant, characteristic features (for example, with reference to the average size, structure, color, shape and homogeneity of these image objects and to their position in the object space relative to the other image objects), which are stored in the form of feature vectors $x_i$ of a feature space $\Omega:=\{x_i, \ldots, x_i, \ldots, x_N\}$ consisting of N elements in the case of N objects (segmented image objects and clusters). In this case, a user employs a feature selector, which is indicated in the feature extractor 102c and can be configured by him, to suppress features selected as irrelevant for a later classification of image objects to be recognized, as a result of which the dimension of the feature vectors $x_i$ decreases by the number of the suppressed features.

The feature vectors obtained are then compared, by using a suitable distance classifier, via a pattern recognition application 102d with stored reference vectors $m_j$ ("prototypes") from a reference image database 104 whose elements respectively reproduce characteristic features of a specific object class (for example, with reference to the average size, structure, color, shape and homogeneity of image objects and clusters) and, for their part, define a reference image space $M:=\{m_1, \ldots, m_j, m_k, \ldots, m_K\}$ consisting of K elements. This distance classifier can, for example, be a nearest neighbor classifier, a k nearest neighbor classifier, a Mahalanobis classifier or, as specified, for example, in FIG. 1a, a minimum distance classifier, in the case of which each feature vector $x_i$ is assigned that object class $c_k$ of an object class space $\Gamma:=\{c_1, \ldots, C_j, c_k, \ldots, c_K\}$, consisting of K non-overlapping object classes, for which the function, given by the expression $d^2(x_i, m_j):=\|x_i-m_j\|_2^2=(x_i-m_j)^T(x_i-m_j)$, of the quadratic Euclidian distance between $x_i$ and the K reference vectors $m_j$ of the reference image space M has a minimum.

For each classified feature vector $x_i$, the respectively identified object class $c_k$ of the associated image object whose prototype is denoted in FIG. 1a by $m_k$ is then transmitted to a central control device 102e of the image processing and pattern recognition system 102, which control device then documents the indices k of the recognized object classes Ck and/or text data denoting reference features of these object classes, or character strings of a standardized data format, doing so respectively in a findings and report file 105, via the input/output interface 102a, and prompts the image data belonging to classified feature vectors of recognized image objects to be read out from the external image data memory 103 of an image rendering application 102f, which is required for conditioning these image data for a two-dimensional and/or three-dimensional graphic visualization on a screen terminal 106, to be rendered and to be displayed in 2D- and/or 3D-rendered form in a display window of a graphic user interface of this screen terminal 106.

As is to be gathered from FIG. 1a, in this case the object class space $\Gamma$ is not restricted to the findings output by the pattern recognition application 102d and specified in the form of recognized object classes of feature vectors to be classified, and so the number of the image data (result data) which relate to these findings and which are requested by the external image data memory 103 by the image rendering application 102f from the prompting of the central control device 102e, that is to say the power of the result set, is likewise not restricted. Thus, requested image data of recognized image objects are graphically displayed in an unselected fashion with the aid of the 2D and/or 3D image rendering application 102f in the form of two-dimensional tomograms and/or three-dimensional perspective views. The time outlay for an evaluation, to be undertaken by a user, subsequent to this procedure, of the result data displayed in graphic form and described in textual form is correspondingly high in this case.

Figure 1B:
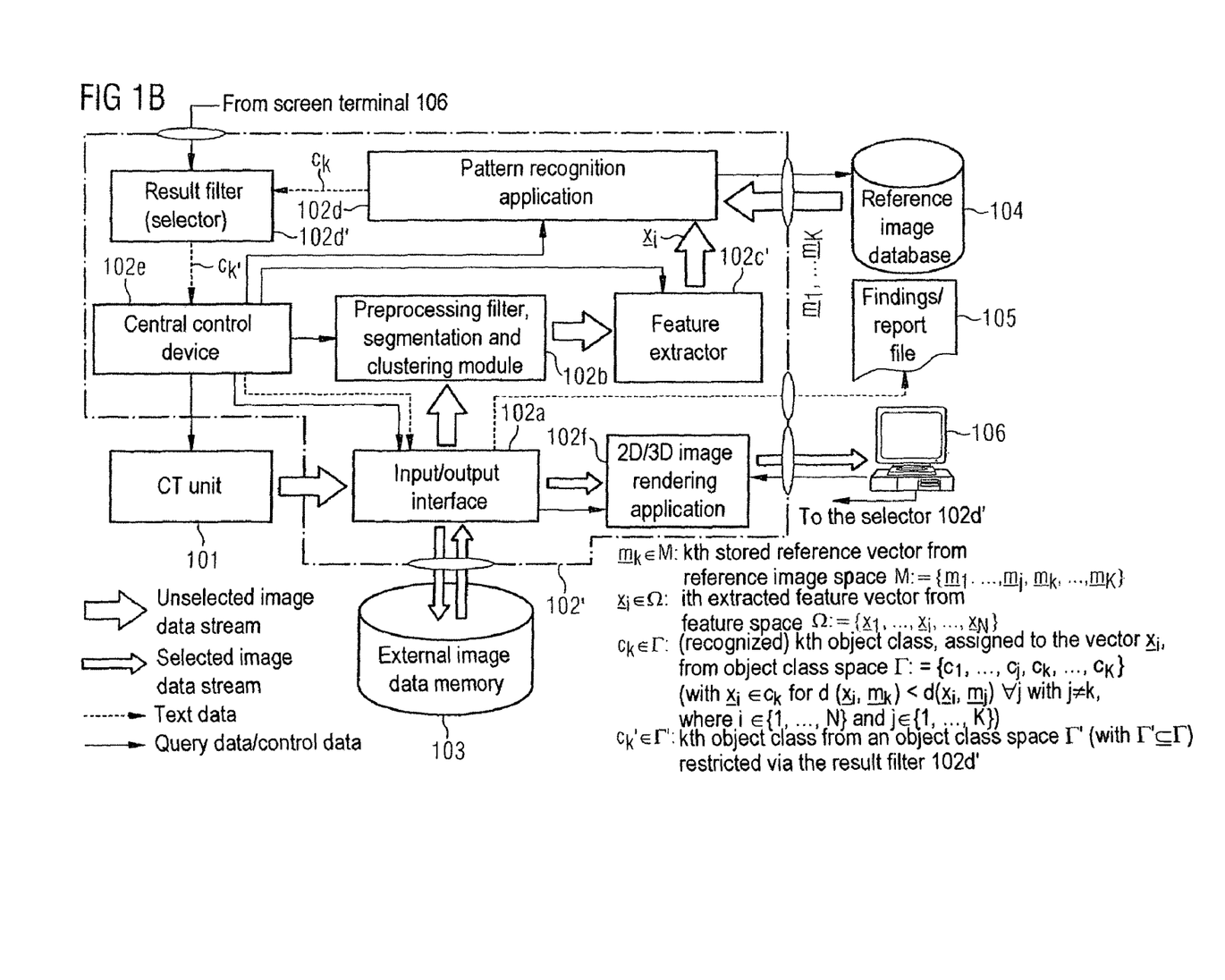
FIG. 1b shows a schematic block diagram of an image processing and pattern recognition system according to a first example embodiment of the present invention that, in addition to the system components of the system illustrated in FIG. 1a, has a user-specifically configurable result filter for selecting the object classes, determined by a pattern recognition application, of classified image objects and image object clusters, and thus for restricting the set, returned by the system, of findings (result set)

By contrast, FIG. 1b illustrates a schematic block diagram of an image processing and pattern recognition system 102' according to a first exemplary embodiment of the present invention, which, in addition to the abovementioned system components for noise suppression, contrast improvement, edge detection, segmentation, cluster formation, feature extraction, automatic pattern recognition and graphic visualization of image objects, which are to be identified, of the image processing and pattern recognition system 102 illustrated in FIG. 1a, has a result filter 102d', which is denoted as "selector" and can be configured specifically for the user, with selectable and/or freely prescribable selection criteria, which result filter is connected downstream of the pattern recognition application 102d.

According to an embodiment of the invention, the result filter 102d' serves for selecting the object classes, determined by the pattern recognition application, of classified image objects and image object clusters, and thus for restricting the set of image data of recognized image objects and image object clusters (result set) that is requested from the external image data memory 103 and returned by the image processing and pattern recognition system 102'. Here, the image rendering application is fed only selected image data that correspond to object classes of an object class space Γ' restricted by the result filter 102d'. According to an embodiment of the invention, this restricted object class space Γ' is a subset of the object class space Γ forming the basis of the pattern recognition application 102d.

In this case, for each classified feature vector $x_i$ the respectively identified object class $c_k$ of the associated image object is transmitted to the central control device 102e of the image processing and pattern recognition system 102' only when this object class is identical to an object class $c_k'$ of the restricted object class space Γ'. Moreover, only text data and/or character strings of the abovementioned standardized data format that are selected according to this result selection are written into the findings and/or report file 105. The use of such a result filter has the advantage that the time outlay for an evaluation, to be undertaken by a user subsequent to the abovenamed procedure, of the result data visualized in graphic form and described in textual form is correspondingly lower than in the case of the image processing and pattern recognition system 102 described with reference to FIG. 1a.

Figure 1C:
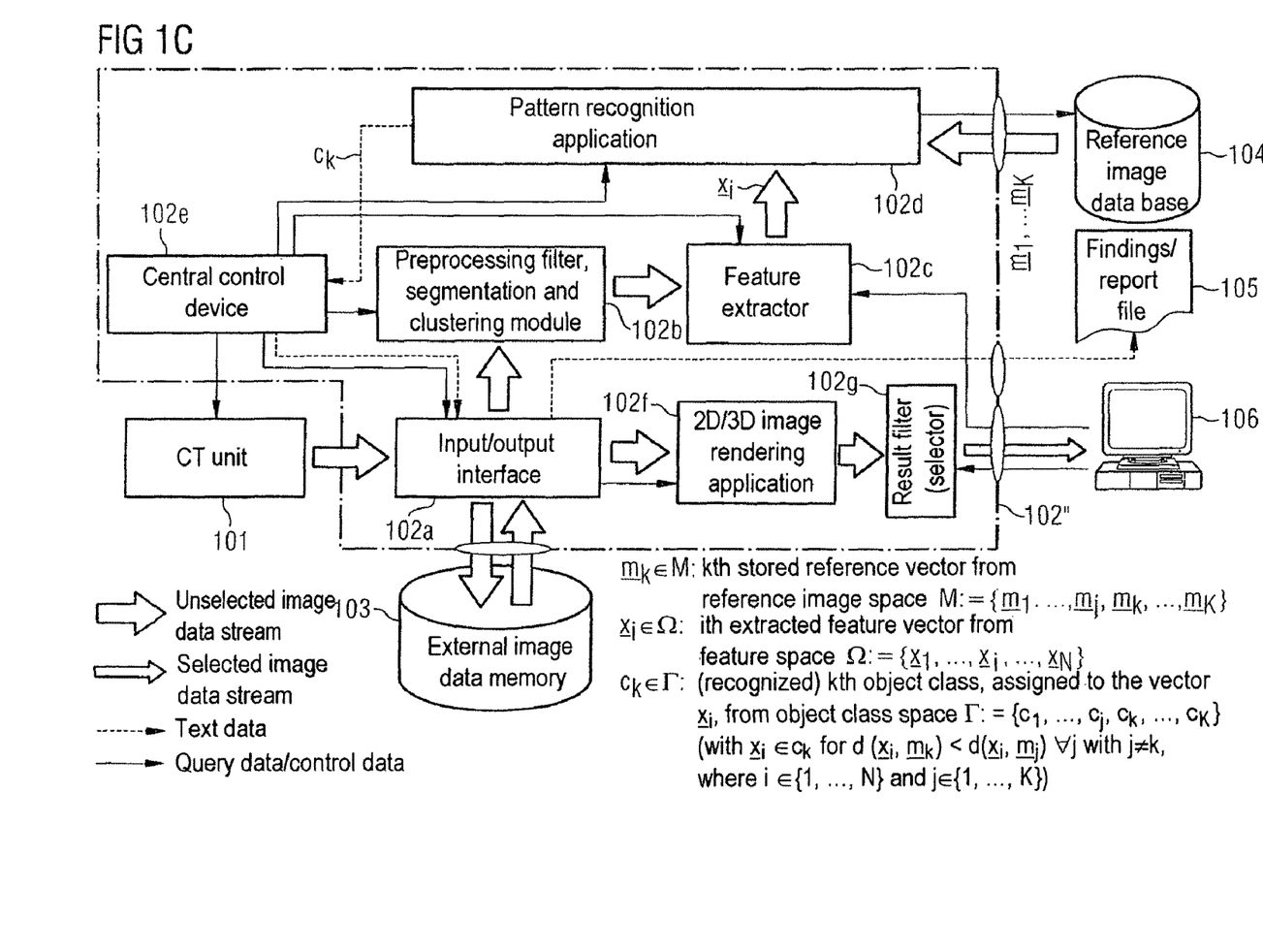
FIG. 1c shows a schematic block diagram of an image processing and pattern recognition system according to a second example embodiment of the present invention that, in addition to the system components of the system illustrated in FIG. 1a, has a user-specifically configurable result filter for selecting and marking classified image objects and image object clusters and those displayed in graphic form with the aid of an image rendering application.

FIG. 1c illustrates a schematic block diagram of an image processing and pattern recognition system 102" according to a second example embodiment of the present invention that, in addition to the system components of the system illustrated in FIG. 1a, has a result filter 102g, denoted as "selector" and that can be configured specifically by the user, with selectable and/or freely prescribable selection criteria for the selection of classified image objects and image object clusters displayed with the aid of a 2D/3D image rendering application 102f in graphic form, which result filter is connected downstream of the 2D/3D image rendering application 102f. With the aid of this result filter 102g, the image objects and image object clusters, classified by the pattern recognition application 102d and displayed on the screen of the screen terminal 106 by the 2D/3D image rendering application 102f, are selected according to a prescribable selection criterion (for example according to designation, type, status, size, number, a prescribable priority, or according to relevance of classified image objects and image object clusters) and marked with text labels of different color and/or with graphic symbols of different shape and color such that the user needs to evaluate only a preselection of image objects and image object clusters provided with text labels and object markings.

Figure 2A:
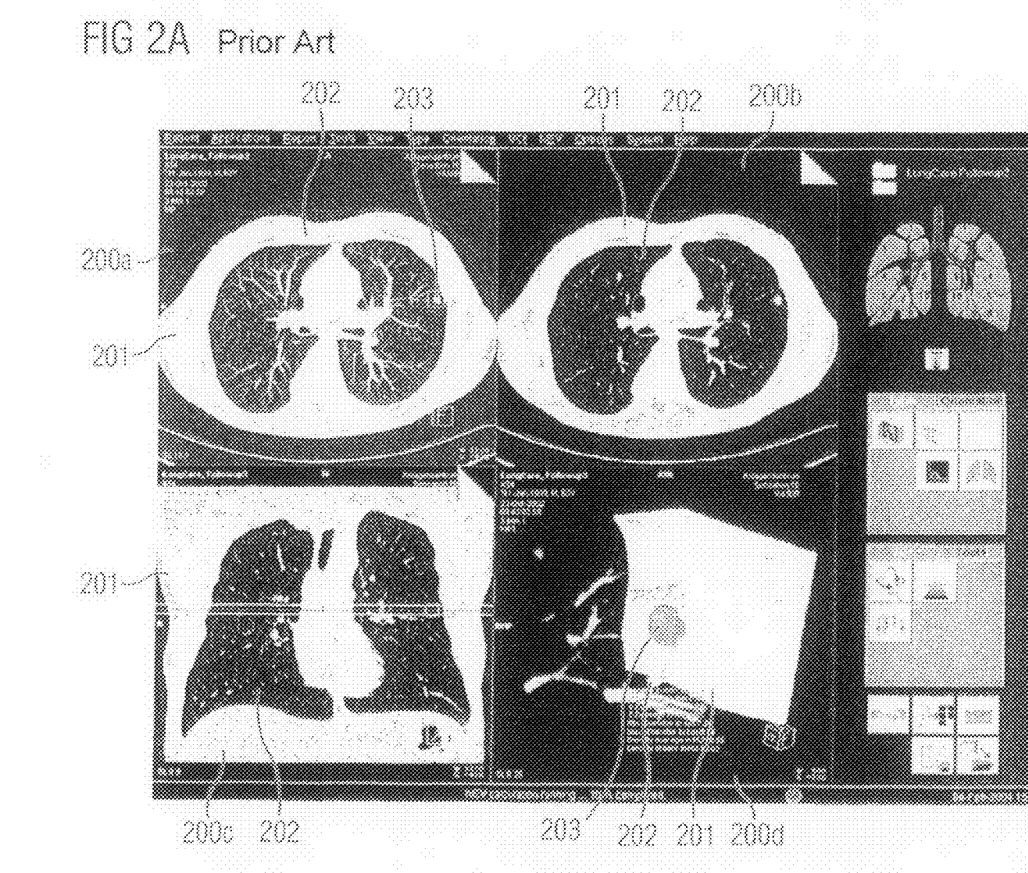
FIG. 2a shows a display window of the graphical user interface of a segmentation, pattern recognition, volume rendering and 3D visualization application (Syngo® LungCARE) that is known from the prior art and is suitable for detecting lesions in the lung tissue of a patient to be examined.

An example of a segmentation, clustering, feature extraction, pattern recognition, volume rendering and 3D visualization application used, in particular, in the clinical field as a computer-aided diagnostic tool for detecting tissue abnormalities in a patient's body interior is the Syngo® Lung-CARE program developed by the Siemens company, in combination with the optional additional module NEV ("Nodule Enhanced Viewing"), whose graphic user interface is illustrated in FIG. 2a. This is a dedicated image pastprocessing software for computer-aided discovery, recognition, documentation, three-dimensional graphic visualization and marking of pulmonary foci (a possible precursor of lung cancer) and other lesions in the interior of the lung, which supports a radiologist during clinical examination and in subsequent investigations of these tissue abnormalities, and increases the diagnostic reliability in the process by pointing out potential lesions to the radiologist. Here, starting from chest X-ray pictures that have been generated in the course of a high-resolution low dose computed tomography (CT) of the thorax of a patient to be examined, Syngo® LungCARE calculates detailed slice displays (200a-c) and detailed three-dimensional displays (200d) of partial views of the lung on which the doctor can clearly recognize even the smallest pulmonary nodules 203 in the form of more or less sharply delimited densifications, of circumscribed in their extent, in the pulmonary tissue 202.

The volume and diameter of the pulmonary foci 203 can subsequently be measured automatically. To make a detailed evaluation, the doctor can view the images from any desired viewing angle of a three-dimensional virtual object space. At the same time, syngo® LungCARE enables a radiologist to compare stored CT pictures of already performed computed tomography examinations with current CT pictures, such that volume changes in individual pulmonary foci 203 can easily be recognized. Together with the image data of rendered 2D and 3D displays of the lung, details input in text form for the purpose of describing the displayed tissue abnormalities such as, for example, position, morphology and characteristic features of localized and identified pulmonary foci 203, are stored in a report file or findings file, with all the image data and text data, whether input manually or produced automatically, being stored in a standardized data format (for example in DICOM format).

The display window of the graphic user interface illustrated in FIG. 2a is subdivided here in four partial windows in which there are displayed axial and/or coronal 2D tomograms (200a-c) of thorax 201 and lung 202 of a patient, as well as a 3D-rendered view (200d) of an identified pulmonary focus 203 with the pulmonary tissue (202) and thoracic tissue (201) that surround it, and which windows have been generated from image data of an X-ray computed tomography of the chest.

Figure 2B:
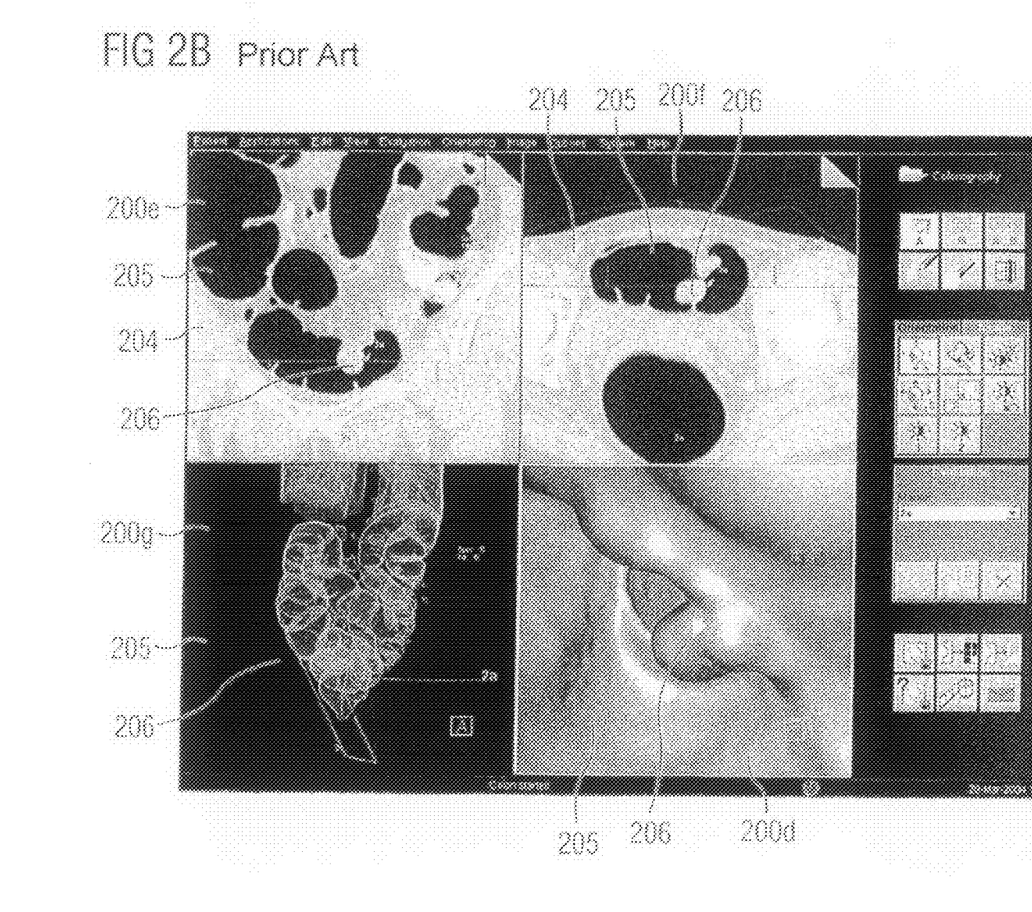
FIG. 2b shows a display window of the graphical user interface of another segmentation, pattern recognition, volume rendering and 3D visualization application (Syngo® Colonography) that is known from the prior art and is suitable for detecting polyps in the region of the colon of a patient to be examined.

FIG. 2b shows the graphic user interface of a further computer-aided diagnostic tool that is known from the prior art and is suitable for detecting tissue abnormalities in a patient's body interior. Here, this is the Syngo® Colonography program, likewise developed by the Siemens company, in combination with the optional additional module PEV ("Polyp Enhanced Viewing"), a dedicated postprocessing software that serves for detecting and diagnosing lesions in the colon by using CT-acquired image data. PEV in this case enables the diagnostic reliability to be increased by alerting the radiologist to potential lesions that are then displayed graphically in three-dimensional form with the aid of a 3D visualization tool of Syngo® Colonography, in order to be able to be assessed.

Using this tool, the radiologist can, for example, better recognize intestinal polyps 206 that occur in the region of the rectum, of the colon and/or of the terminal ileum (that is to say in the region of the rectum, the colon and in the end region of the small intestine at the site of transition to the colon), and distinguish them more effectively from similarly appearing tissue structures.

In this case, a specifically developed software program is used to calculate, from the data of a low dose computed tomography of the abdominal cavity (abdomen) of a patient to be examined, a detailed three-dimensional display of the inner intestinal walls, on which even the smallest polyps, a possible precursor of intestinal cancer, are clearly to be recognized. The software enables the doctor to navigate virtually through the intestine 205 of a patient, to inspect constricted intestinal sections and regions lying therebehind, to mark found intestinal polyps 206 and measure them, and to determine their exact position for removal that may be necessary. The possibility of virtual navigation in this case particularly facilitates the finding of lesions that are difficult to localize and which are located between individual intestinal folds. Owing to this largely automated, computer-aided operational cycle, only approximately ten minutes elapse from the carrying out of the radiological imaging process up to the diagnosis.

The display window of the graphic user interface illustrated in FIG. 2b is subdivided in this case into four partial windows 200e-h in which respectively axial and coronal 2D tomograms (200e and 200f) of the colon 205 are displayed together with the patient's abdominal and pelvic region 204 surrounding it, as well as three-dimensional virtual external and internal views (200g and 200h) respectively of the colon 205 in a section between the anus-side end of the rectum and the transition site of colon and terminal ileum, which have been generated from image data of X-ray computed tomography of the abdomen.

Figure 3:
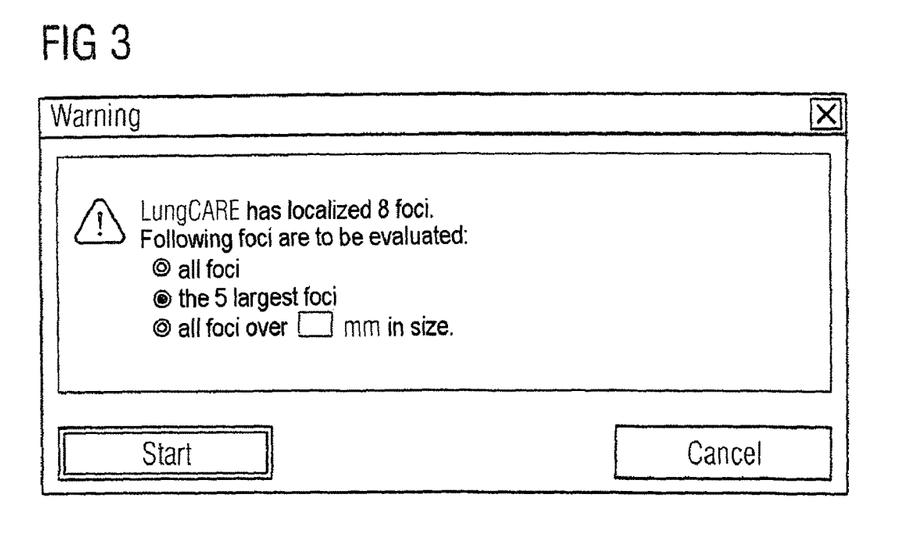
FIG. 3 shows a configuration window for selection between three different selection criteria of an inventive result filter that serves for restricting the result set of a segmentation, pattern recognition, volume rendering and 3D visualization application (Syngo® LungCARE) used for finding and classifying pulmonary foci in the lung tissue of a patient to be examined, as well as for configuring an inventive selection method for preselecting identified pulmonary foci, to be displayed graphically, for subsequent evaluation by a radiologist.

FIG. 3 illustrates an example of a configuration window of an image processing, pattern recognition and image rendering application which can be called up in order to select between various selection criteria of one of the inventive result filters 102d' and 102g, respectively. The set of image data of classified image objects that is to be evaluated, which image data are requested via the 2D/3D image rendering application 102f and are displayed in 2D- and/or 3D-rendered form in a display window of the graphic user interface of the screen terminal 106, is capable of being restricted in this case by a user through stipulation of a suitable selection criterion and/or through limiting the number of image objects to be selected and marked. In this case, the example illustrated relates to a configuration window of the Syngo® LungCARE segmentation, pattern recognition, volume rendering and 3D visualization application that is described with reference to FIG. 2a, is used to find, recognize and classify pulmonary foci in a patient's lung tissue and serves for the configuration of a selection method for preselecting identified pulmonary foci, which are to be graphically displayed, for subsequent evaluation by a radiologist.

As is to be gathered from FIG. 3, depending on pattern recognition algorithm and clinical problem, and/or depending on the type of a disease to be diagnosed, the radiologist can either configure the result filter 102d' and 102g, respectively, in advance with suitable selection criteria, or choose directly upon the start of the pattern recognition application 102d between various selection criteria that are on offer in the configuration window of this result filter. By way of example, the user can stipulate as selection criteria in this case that image data stored in the external image data memory 103, and/or result data, supplied by the pattern recognition application 102d as text or character string of a standardized data format, of all image objects whose feature vectors can be assigned to one of the object classes found by the pattern recognition application 102d (for example image data of all pulmonary foci recognized as such), only image data and/or text data of the abovenamed type that relate to a prescribable maximum number of the largest identified image objects (for example image data of at most five of the largest pulmonary foci recognized as such), or only image data and/or text data of the abovenamed type that relate to identified image objects from a prescribable minimum size (for example image data of pulmonary foci, recognized as such, with an average diameter of over 5 mm), are returned and visualized graphically in 2D- or 3D-rendered form. The selection of one of these selection criteria is governed, firstly, by the type of a clinical picture to be diagnosed given the presence of a specific suspected diagnosis, and secondly by the time expended by the respective radiologist evaluating these result data. In the two last-named cases, the radiologist monitors only a restricted number of result data, but the remaining result data are not automatically deleted from the external image data memory 103 and the findings file and/or report file 105 and can, if required, likewise be displayed in graphic form.

Figure 4:
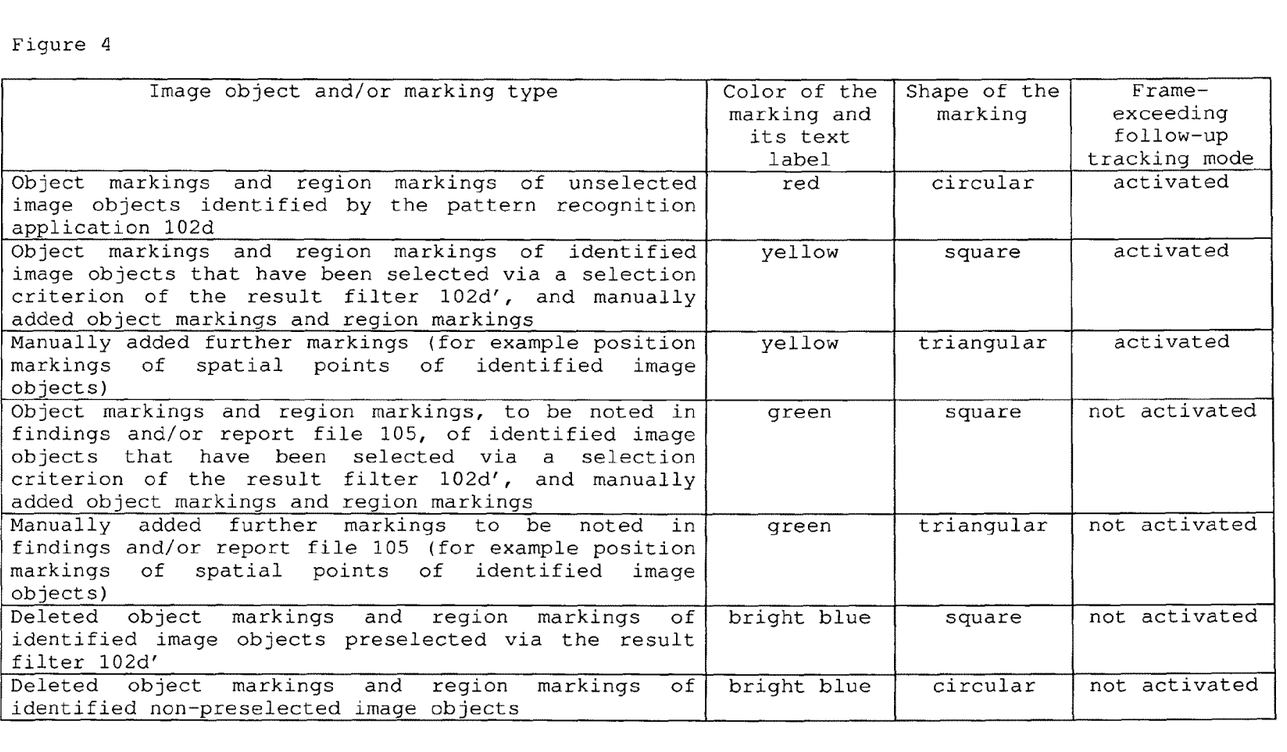
FIG. 4 shows a configuration table for user-specific definition of the shape and color, and of the possibility of a frame-exceeding tracking of a set of automatically inserted, manually added and/or deleted object markings.

FIG. 4 illustrates an example of a configuration table for user-specific definition of the shape and color, and of the possibility of a frame-exceeding tracking of a set of object markings, automatically inserted, manually added and/or deleted by the image rendering application 102f. In this case, the object markings are used to identify image objects that are displayed on the screen of the screen terminal 106, and identified by the pattern recognition application 102d and/or by a user, and whose feature vectors have been assigned to the unrestricted (unselected) object class space Γ or to the object class space Γ' restricted (selected) by a selected selection criterion.

A user can in this case stipulate that, depending on designation, type, status, size, priority and/or relevance of the marked image objects or the image objects included in marked image sections, object markings and region markings of marked image objects or image sections can be displayed differently, for example, with a different shape and/or color. In addition, or as an alternative thereto, it can also be stipulated that the associated text labels of these object and region markings are likewise displayed in a specific color, font size and/or font type, depending on designation, type, status, size, priority and/or relevance of the respective marked image objects or the image objects included in the marked image sections. As is to be gathered from FIG. 4, it is also possible to use the configuration table to stipulate color and/or shape of the object and/or region markings deleted by a user and identified as deleted in the object and/or region marking list, as well as color, font size and/or font type of their associated text labels.

Figure 5A:
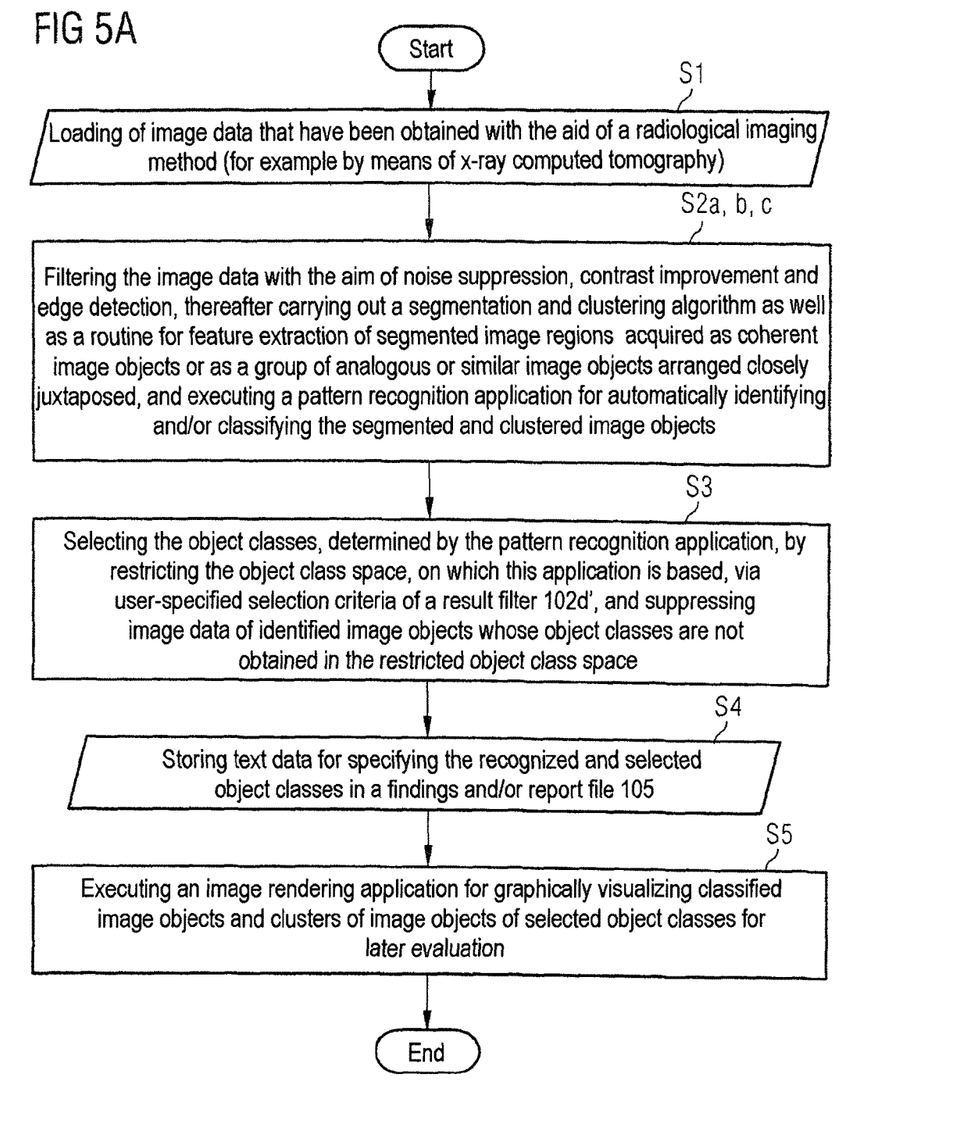
FIG. 5a shows a flowchart of an application for the segmentation, feature extraction, automatic pattern recognition and graphical visualization of image objects to be classified and displayed in graphic form, in the case of which according to the invention a procedure is performed for selecting classified image objects and image object clusters directly subsequent to a routine for automatic pattern recognition of the image objects to be classified.

FIG. 5a illustrates a flowchart of an application for the segmentation, feature extraction, automatic pattern recognition and graphic visualization of image objects to be classified and displayed in graphic form. In this case, image data obtained with the aid of a radiological imaging method (for example by means of X-ray computed tomography) are loaded (S1) and subjected to a filtering procedure for noise suppression, contrast improvement and edge detection. Carried out thereafter is a segmentation and clustering algorithm with the aid of which image regions of the same or similar structure are acquired (segmented) as coherent image objects, and the segmented image objects are combined (S2a) to form clusters upon the undershooting of a prescribed distance and compliance with a similarity criterion. Significant features are then extracted from the image data of the segmented and clustered image objects, and are stored (S2b) in the form of a set of feature vectors to which, subsequent thereto, a pattern recognition application (S2c) is applied for automatic identification and/or classification of the segmented and clustered image objects.

According to the variant of an embodiment of the inventive method sketched in this flowchart, directly thereafter a procedure is performed for selecting (S3) the object classes determined by the pattern recognition application, the object class space on which this application is based being restricted in a suitable way via user-specified selection criteria of a result filter 102d'. Image data of identified image objects whose object classes are not included in the restricted object class space are suppressed in this case in accordance with the invention. After termination of this procedure, text data for specifying the object classes recognized and selected by the pattern recognition application are stored in a findings and/or report file 105 (S4). According to an embodiment of the invention, it is then only classified image objects and image object clusters of selected object classes that are displayed in graphic form when executing an image rendering application (S5) for a later evaluation of the data supplied by the pattern recognition application.

Figure 5B:
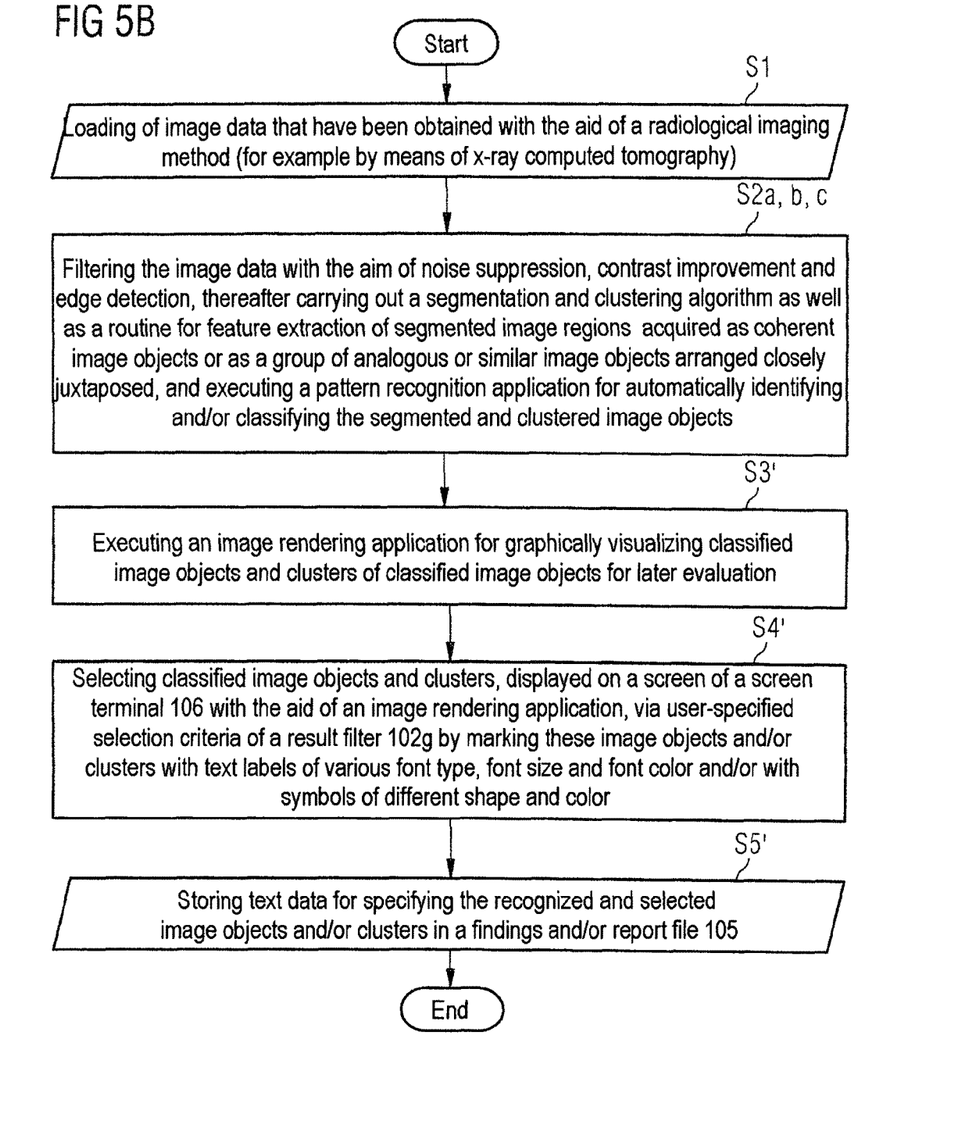
FIG. 5b shows a variant of the flowchart illustrated in FIG. 5a, in the case of which the abovenamed procedure for selecting classified image objects and image object clusters is performed subsequent to a routine for automatic pattern recognition and a procedure for carrying out 2D/3D image rendering.

FIG. 5b illustrates a variant of the flowchart depicted in FIG. 5a, in the case of which an embodiment of the inventive selection method (S4') is performed subsequent to a routine for automatic pattern recognition (S2c) and a procedure for carrying out a 2D/3D image rendering (S3'), by means of which classified image objects and image object clusters are displayed in graphic form for later evaluation. In this case, selection of image objects and image object clusters that are classified and displayed in graphic form with the aid of the image rendering application is performed via user-specified selection criteria of a result filter 102g. Selected image objects and/or image object clusters are marked by text labels of different color and/or by symbols of different shape and color and thus identified as selected. As in the case of the method described with reference to FIG. 5a, here, as well, text data for specifying the image objects and clusters recognized and selected by the pattern recognition application are stored (S5') in a findings and/or report file 105.

The advantage of an embodiment of the inventive preselection and/or marking of classified image objects and image object clusters resides in a saving of time for the radiologist, which is to be ascribed to the fact that at the time of starting the pattern recognition application used in the context of a computer-aided diagnostic tool, all image objects to be displayed in order to carry out a 2D and/or 3D image rendering, and/or CAD algorithms required for carrying out an image postprocessing have already been carried out and concluded in advance such that, after executing the pattern recognition application, the radiologist can begin the evaluation of 2D- and/or 3D-rendered displays of segmented image objects identified by the pattern recognition application, without incurring a further time loss.

An additional advantage for the radiologist resides in a further significant time saving since, by comparison with the number of unselected findings returned by the pattern recognition application, after termination of the inventive automatically running procedure he or she need monitor, verify, evaluate and clinically establish a by far lower number of findings for the purpose of selecting the findings returned by the same pattern recognition application in a way that can be defined by the user.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for at least one of automatically classifying and graphically visualizing image objects:
    combining a plurality of segmented image objects, given undershooting of a distance and compliance with a similarity criterion, to form clusters;
    automatically preselecting at least one of,
        result data, for object classification, using a prescribable attributive selection criterion, from a result set of an application for feature extraction and automatic pattern recognition of the segmented and clustered image objects, and
        rendered image data of an image rendering application for at least one of two-dimensional and three-dimensional graphic visualization of the image objects; and
    marking the preselected data, in a graphically visible fashion, as preselected on a screen of a screen terminal, wherein the automatically preselected at least one of result data and rendered image data is executed simultaneously in a background on an image data record of an imaging system, with the marking the preselected data, and the result set is a list of findings to be evaluated that is sorted according to a specific sorting criterion, the result set is automatically updated upon recognition, identification and deletion of a wrongly classified image object, the result data following as a respective next list element is automatically added to the result set upon the recognition, identification and deletion of the wrongly classified image object.

2. The method as claimed in claim 1, wherein the automatic preselection of at least one of the result data and the rendered image data is performed directly after termination of the application for automatic pattern recognition of segmented and clustered image objects.

3. The method as claimed in claim 1, wherein the automatic preselection of at least one of the result data and the rendered image data is performed subsequent to an image rendering application, executed in the background at least one of during and after execution of the application for automatic pattern recognition, for providing rendered image data for at least one of a two-dimensional and three-dimensional graphic visualization of at the at least one of segmented and clustered image objects.

4. The method as claimed in claim 2, wherein object classes determined by the pattern recognition application are selected by restricting an object class space, forming the basis of the pattern recognition application, via user-specified selection criteria of a result filter, and image data of identified image objects whose object classes are not included in the restricted object class space are suppressed.

5. The method as claimed in claim 3, wherein only classified image objects that are preselected and marked in a graphically visible fashion as preselected within an image section selected by a region marking are displayed on the screen of the screen terminal by suppressing the transmission to the screen terminal of rendered image data of all remaining image sections and classified image objects.

6. The method as claimed in claim 3, wherein the rendered image data of at least one of the non-selected image sections and of the classified image objects that are not at least one of preselected and marked in a graphically visible fashion as preselected, are transmitted upon request to the screen terminal and graphically visualized on the screen.

7. The method as claimed in claim 1, wherein the prescribable attributive selection criterion includes at least one of a designation, a type, a status, a size, a number, a prescribable priority, and a relevance of classified image objects that is to be taken into consideration for a later evaluation.

8. The method as claimed in claim 1, wherein result data of additional findings that relate to further image objects at least one of identified and classified by a user are manually addable to the list of the findings to be evaluated.

9. The method as claimed in claim 8, wherein object markings of image objects from the result set of deleted findings are also displayed on the screen of the screen terminal after the deletion of these findings.

10. The method as claimed in claim 9, wherein, depending on at least one of designation, type, status, size, priority and relevance of at least one of the marked image objects and the image objects included in marked image sections, object markings and region markings for at least one of marking image objects and image sections are stored and graphically displayed as graphic symbols of different at least one of shape and color or as text labels of at least one of different font size, font type and font color.

11. A pattern recognition and image rendering system for at least one of automatically classifying and graphically visualizing image objects, the system comprising:
a processor to combine a plurality of segmented image objects, given undershooting a distance and compliance with a similarity criterion, to form clusters; and
a result filter to automatically preselect result data for object classification from a result set of an application, simultaneously executed in a background on an image data record of an imaging system with a marking of the preselect result data, for feature extraction and automatic pattern recognition of the segmented and clustered image objects, and the result set is a list of findings to be evaluated that is sorted according to a specific sorting criterion, the result set is automatically updated upon recognition, identification and deletion of a wrongly classified image object, the result data following as a respective next list element is automatically added to the result set upon the recognition, identification and deletion of the wrongly classified image object.

12. The pattern recognition and image rendering system as claimed in claim 11, further comprising a second result filter to graphically visible mark preselected rendered image data of an image rendering application, executed in the background, for at least one of two-dimensional and three-dimensional graphic visualization of classified image objects on a screen of a screen terminal by using a prescribable attributive selection criterion.

13. The pattern recognition and image rendering system as claimed in claim 12, wherein the result filter is directly downstream of the application for automatic pattern recognition of the segmented and clustered image objects.

14. The pattern recognition and image rendering system as claimed in claim 13, wherein the second result filter is downstream of an image rendering application, executed at least one of during and after execution of the application for automatic pattern recognition, for graphically visualizing the at least one of segmented and clustered image objects.

15. A computer software program product for carrying out a method as claimed in claim 1 during operation on a screen terminal of a pattern recognition and image rendering system.

16. The method as claimed in claim 5, wherein the rendered image data of at least one of the non-selected image sections and of the classified image objects that are not at least one of preselected and marked in a graphically visible fashion as preselected, are transmitted upon request to the screen terminal and graphically visualized on the screen.

17. The pattern recognition and image rendering system as claimed in claim 11, wherein the result filter is useable to at least one of automatically preselect and graphically visible marking of preselected rendered image data of an image rendering application, executed in the background, for at least one of two-dimensional and three-dimensional graphic visualization of classified image objects on a screen of a screen terminal by using a prescribable attributive selection criterion.

18. The pattern recognition and image rendering system as claimed in claim 11, wherein the result filter is directly downstream of the application for automatic pattern recognition of the segmented and clustered image objects.

19. A method for automatically classifying and graphically visualizing image objects, the method comprising:
combining a plurality of segmented image objects, given undershooting of a distance and compliance with a similarity criterion, to form clusters;
automatically preselecting at least one of
result data, for object classification, using a prescribable attributive selection criterion, from a result set of an application for feature extraction and automatic pattern recognition of segmented and clustered image objects, and
rendered image data of an image rendering application for at least one of two-dimensional and three-dimensional graphic visualization of the image objects; and
marking the preselected data, in a graphically visible fashion, as preselected on a screen of a screen terminal, wherein the automatically preselected at least one of result data and rendered image data is executed simultaneously in a background on an image data record of an imaging system, with the marking the preselected data, and the result set is a list of findings to be evaluated that is sorted according to a specific sorting criterion, the result set is automatically updated upon recognition, identification and deletion of a wrongly classified image object, the result data following as a respective next list element is automatically added to the result set upon the recognition, identification and deletion of the wrongly classified image object.

* * * * *